United States Patent [19]
Murphy

[11] Patent Number: 4,725,114
[45] Date of Patent: Feb. 16, 1988

[54] OPTICAL WAVEGUIDE LATERAL ALIGNMENT ARRANGEMENT

[75] Inventor: Edmond J. Murphy, Bethlehem, Pa.

[73] Assignee: American Telephone and Telegraph Company, AT&T Bell Laboratories, Murray Hill, N.J.

[21] Appl. No.: 780,920

[22] Filed: Sep. 27, 1985

Related U.S. Application Data

[63] Continuation-in-part of Ser. No. 655,630, Sep. 28, 1984, abandoned.

[51] Int. Cl.$^4$ .................................................. G02B 6/30
[52] U.S. Cl. .............................. 350/96.17; 350/96.12
[58] Field of Search ............... 350/96.15, 96.17, 96.21, 350/96.22, 96.12

[56] References Cited

U.S. PATENT DOCUMENTS

| | | | |
|---|---|---|---|
| 4,026,633 | 5/1977 | Crick | 350/96.21 |
| 4,088,386 | 6/1978 | Hawk | 350/96.21 |
| 4,186,997 | 2/1980 | Schumacher | 350/96.21 |
| 4,217,032 | 8/1980 | Sheem | 350/96.21 |
| 4,367,011 | 1/1983 | Monaghan | 350/96.20 |
| 4,440,471 | 4/1984 | Knowles | 350/96.20 |
| 4,639,074 | 1/1987 | Murphy | 350/96.15 |
| 4,657,341 | 4/1987 | Sammueller | 350/96.22 |

OTHER PUBLICATIONS

"Titantium in-diffused LiNbO$_3$ . . . ", *Applied Optics*, vol. 18, No. 12, Jun. 1979. L. W. Stulz, pp. 2041–2044.
"Ridge Waveguides and Electro-Optical . . . ", *IEEE Trans. on Circuits and Systems*, vol. CAS-26, No. 12, Dec. 1979, M. Kawabe et al, pp. 1109–1113.
"Influence of Temperature and Initial . . . ", *IEEE Journal of Quantum Electronics*, vol. QE-19, No. 2, Feb. 1983, L. McCaughan et al, pp. 131–136.

*Primary Examiner*—Eugene R. LaRoche
*Assistant Examiner*—Steven J. Mottola
*Attorney, Agent, or Firm*—Wendy W. Koba

[57] ABSTRACT

An arrangement for providing optical coupling between a pair of substrates is disclosed. The arrangement is capable of providing automatic alignment in the lateral direction, that is, the direction perpendicular to the direction of optical signal flow along the surface of the optical substrate. In accordance with the teachings of the present invention, an interlocking system of alignment grooves and alignment ridges are utilized to prevent this unwanted motion and aid in alignment between the two pieces. In particular, an alignment ridge, or ridges, are formed on the top surface of a first substrate and are disposed to be parallel with a plurality of optical waveguides formed in the first substrate. The corresponding alignment grooves are formed in the second substrate, where this substrate may contain a plurality of fibers held in associated v-grooves. Waveguide-to-waveguide communication is achieved by forming alignment ridges on a pair of waveguide containing substrates. The substrates may then be placed end-to-end, where the alignment grooves in the second substrate will interlock with both sets of alignment ridges. As long as the dimensions of the alignment ridges and grooves are formed to complement each other in size - and are spaced similarly in their respective substrates - the alignment ridges and grooves will interlock when the two substrates are joined, thus preventing motion between the two substrates in the lateral direction.

12 Claims, 5 Drawing Figures

OPTICAL WAVEGUIDE LATERAL ALIGNMENT ARRANGEMENT

CROSS-REFERENCE TO RELATED APPLICATIONS

This application is a continuation-in-part of Ser. No. 655,630, filed Sept. 28, 1984, now abandoned.

BACKGROUND OF THE INVENTION

1. Field of the Invention

The present invention relates to an optical waveguide lateral alignment technique and, more particularly, to an interlocking ridge and groove technique which is utilized to join together a pair of substrates and prevent motion in the lateral direction. This alignment technique is applicable to coupling a substrate containing waveguides to one containing fibers, as well as waveguide-to-waveguide coupling.

2. Description of the Prior Art

As fiber optics becomes an ever increasing choice for data, voice, and video communications, the requirements on the quality of the optically transmitted signal become more demanding. One area which has received great attention is the problem of coupling the optical signal; either between a fiber and an optical waveguide, or between a pair of optical waveguides. Indeed, a significant part of the packaging problem is due to the stringent alignment tolerances required for coupling between devices and optical fibers. To date, most applications have required the alignment of only a single fiber to a single optical device. However, with the advent of integrated optical devices, the need has arisen to align linear arrays of fibers to devices. One prior art technique for accomplishing array alignment is disclosed in U.S. Pat. No. 4,217,032 issued to S. K. Sheem on Aug. 12, 1980. The Sheem technique utilizes a two-dimensional, intersecting groove pattern formed in a silicon substrate wherein a groove in one direction is deeper than the corresponding intersecting groove, and an alignment fiber rests in the deeper groove. The shallow groove accommodates an optical fiber sized to contact the alignment fiber. The alignment fiber is tapered so that as it slides along the groove, it raises or lowers the optical fiber to a level which yields maximum optical transmission. This alignment technique becomes extremely time consuming when a large array of optical fibers must be individually aligned.

An alternative alignment arrangement which does not require individual alignment is disclosed in U.S. Pat. No. 4,196,997 issued to W.L. Schumacher on Feb. 5, 1980. The Schumacher disclosure relates to a method and apparatus for connecting optical waveguides in coincident alignment, and features a connector divided into intermating sections, each section in the form of an open box configuration provided with a projecting tongue for mating with the other section. This method is not applicable to the situation where one of the sections to be aligned contains a plurality of optical fibers.

An alternative prior art coupling technique utilizes a fiber array cover plate which has an endface coplanar with the ends of the individual fibers. This technique is disclosed in a copending application Ser. No. 621,453, filed on June 18, 1984 and assigned to the same assignee as the present application. As disclosed in Ser. No. 621,453, the use of a plurality of fibers disposed in grooves with the above-described cover plate results in an alignment technique which will automatically align five of the six possible degrees of freedom associated with coupling the fiber array to an optical waveguide substrate, the remaining degree of freedom being defined as lateral alignment, i.e., the alignment in the plane of the top surface of the substrate which is perpendicular to the direction traveled by the optical signal. Present techniques for performing this final alignment require the observation of optical throughput, where the alignment must be adjusted until maximum throughput intensity is achieved. When an array connection is required, this alignment technique becomes cumbersome and time-consuming.

Therefore, a need remains in the prior art for a technique which provides automatic lateral alignment when performing fiber-to-waveguide coupling, or alternatively, waveguide-to-waveguide coupling, which does not require a real-time observation of optical throughput.

SUMMARY OF THE INVENTION

The present invention relates to an optical waveguide lateral alignment technique and, more particularly, to an interlocking groove and ridge alignment technique which is utilized to join together a pair of optical substrates and prevent motion in the lateral direction. This alignment technique is applicable to couping a substrate containing optical waveguides to one containing optical fibers, as well as coupling a pair of substrates which both contain optical waveguides.

It is an aspect of the present invention to provide an alignment technique which is equally applicable to situations requiring either fiber-to-waveguide alignment or waveguide-to-waveguide alignment.

Another aspect of the present invention is to provide an alignment technique which is compatible with prior art alignment techniques such that a combination of the present invention with the prior art techniques provides an alignment procedure which is capable of automatically aligning all of the six possible degrees of freedom between the aligning pieces.

A further aspect of the present invention is to provide an an alignment technique which is equally applicable to single fiber-to-waveguide alignments as well as alignments of arrays of fibers to arrays of waveguides.

Yet another aspect of the present invention is to provide an alignment technique which can be utilized with either multimode or single mode optical transmission systems.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

As discussed above, the advent of integrated optical devices has resulted in the need for a passive method of optical alignment which is equally applicable to single mode and multimode devices, lasers, detectors, active waveguide structures and passive waveguide structures. It is apparent that new techniques must also be developed which simplify the alignment process by reducing the number of degrees of freedom which must be actively adjusted or, optimally, automating the entire alignment process. The present invention relates to such an automatic alignment arrangment which relies an a novel interlocking ridge and groove structure between a pair of optical substrates to automatically align the two pieces in the lateral direction. The present technique is equally applicable to single mode and multimode guided wave devices in glass, lithium niobate (LiNbO$_3$) and various semiconductor or other materials. As will be discussed below in detail, the alignment arrangement is totally independent of the type of optical devices (e.g., waveguides, fibers, etc.) so long as the devices may be formed in, or are in contact with, an optical substrate.

Figure 1:
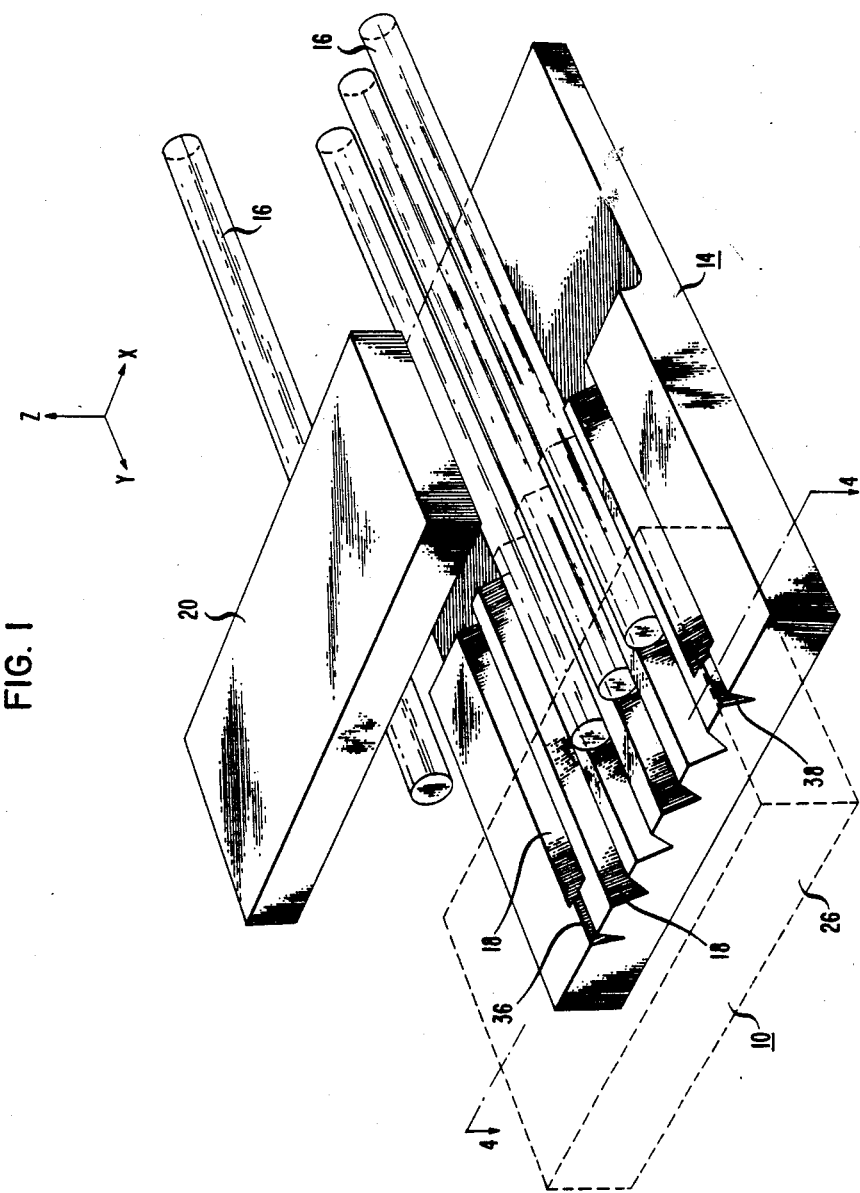
FIG. 1 illustrates an exemplary embodiment of the coupling arrangement of the present invention for coupling an array of optical fibers to an array of waveguides.

FIG. 1 illustrates an exemplary waveguide-to-fiber coupler formed in accordance with the present invention which is capable of automatically aligning all six possible degrees of freedom. A waveguide substrate 10 is shown in phantom is FIG. 1, and is illustrated in detail in FIG. 2. Substrate 10 may comprise any suitable material, for example LiNbO$_3$, which is compatible with optical transmission systems. A plurality of waveguides 12 are included in substrate 10, where waveguides 12 may be formed by diffusin titanium into the lithium niobate. Referring to FIG. 1, a chip 14, for example, a silicon chip, is designed to hold a plurality of optical fibers 16 in a plurality of corresponding v-grooves 18. Although silicon is a preferred material, other appropriate materials may be utilized to hold fiber array 16. A cover plate 20 is disposed over silicon chip 14 so as to "sandwich" fibers 16 between silicon chip 14 and cover plate 20. It is to be noted that the described alignment configuration is equally applicable in multimode and single mode transmission systems. A detailed description of this alignment arrangement can be found in copending Ser. No. 621,453, filed on June 18, 1984 and assigned to the assignee of the present application.

Figure 2:
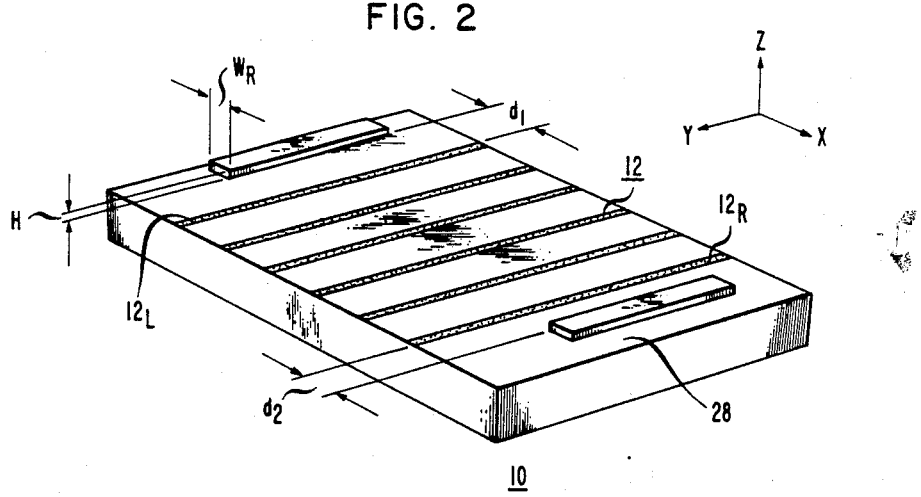
FIG. 2 illustrates a waveguide substrate including alignment ridges formed in accordance with the present invention.

The principle of this alignment arrangement can be demonstrated by defining a set of coordinates as shown in FIG. 2. The x and y coordinates are defined in the plane of a top surface 28 of waveguide substrate 10, with the y-axis along the length of the plurality of waveguides 12 and the x-axis across the width of substrate 10. The z-axis is perpendicular to this plane and $\theta_x$, $\theta_y$, and $\theta_z$ are defined as the rotational movements about their respective axes. Referring now to FIG. 1, the y and $\theta$hd z positions are completely determined by butting endface 22 of cover plate 20 and the ends of fibers 16 against endface 26 of substrate 10, while z, $\theta_x$ and $\theta_y$ are determined by placing silicon chip 14 in contact with top surface 28 of waveguide substrate 10. The arrangement as presently described, however, must still be actively aligned in the x direction. This active alignment is usually accomplished by monitoring the optical throughput and adjusting the coupling arrangement until maximum optical throughput is achieved.

The present invention provides an alignment arrangement which does not require the constant, active measurement of the optical throughput to achieve alignment in the lateral direction, defined above as the x-axis direction. Instead, a set of grooves and ridges are formed on a pair of substrates to be coupled (the grooves on a first substrate and the ridges on the second, remaining substrate) which interlock when the pair of substrates are brought into contact and prevent any substantial movement in the lateral direction. Waveguide substrate 10, illustrated in FIG. 2, contains a pair of alignment ridges 32 and 34 for use in accordance with the preesnt invention. Since it is the conventional practice to form waveguides 12 by diffusing titanium into a lithium niobate substrate, alignment ridges 32 and 34 may also be formed from titanium to simplify the addition of alignment ridges to the standard manufacturing process. However, any other material which is capable of adhering to the top surface of substrate 10 may be utilized in practicing the present invention. In particular, SiO$_2$ has been found to be a preferred material to use in forming alignment ridges. Alignment ridges 32 and 34, as shown in FIG. 2, comprise a height, denoted H, of approximately one micron and a width, denoted W$_R$, of approximately 10 microns. It is to be understood that various other height and width dimensions may be used in the practice of the present invention, as long as the alignment ridges are capable of interlocking with the alignment grooves when mated. Additionally, alignment ridges 32 and 34 may comprise any suitable cross-section, for example, square, triangular, rounded, etc., which will mate with the grooves and prevent motion in the lateral direction. Lastly, any number of alignment ridges may be utilized in accordance with the present invention, where only a pair of ridges are shown in FIG. 2 for illustrative purposes. For example, it may be desirable to interleave alignment ridges with waveguides, or position them on individual waveguides, where the additional ridges are considered to aid in the rigidity of the resultant structure. In principle, however, a single interlocking alignment ridge and groove will function to prevent motion in the lateral direction in accordance with the present invention.

Figure 3:
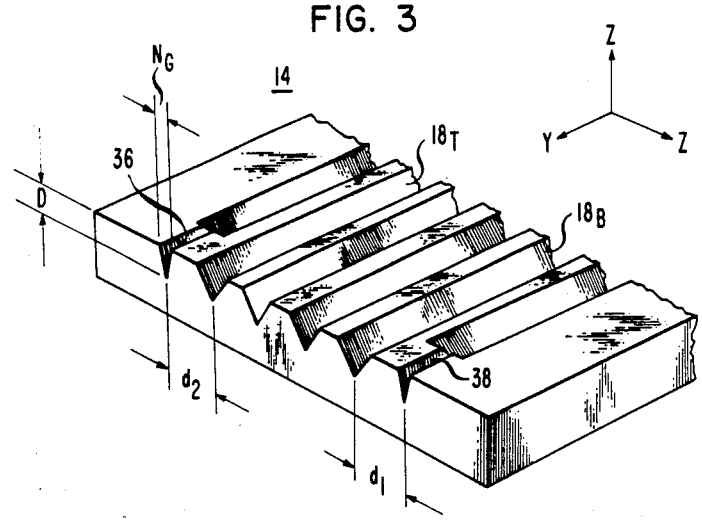
FIG. 3 illustrates a silicon chip for holding a fiber array including alignment grooves formed in accordance with the present invention.
Figure 4:
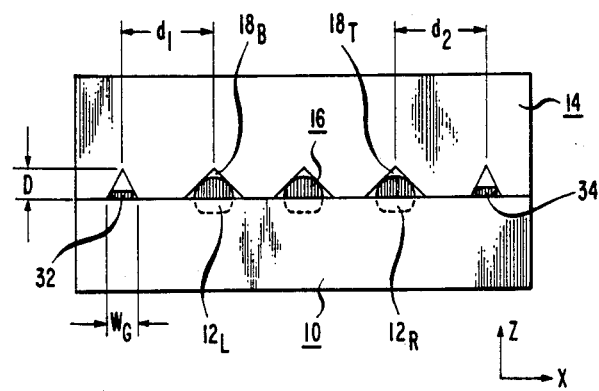
FIG. 4 illustrates in a cut-away view an optical fiber-to-waveguide coupler utilizing the alignment ridges and grooves of the present invention as illustrates in FIGS. 2 and 3.

Referring to FIG. 2, it is shown that alignment ridge 32 is disposed a distance d$_1$ from the left-most waveguide 12$_L$ and alignment ridge 34 is disposed a distance d$_2$ from the right-most waveguide 12$_R$. Therefore, when forming the associated alignment grooves, as discussed below, these distances must be followed as closely as possible to provide optimal coupling. FIG. 3 illustrates a view in perspective of silicon chip 14, including the plurality of v-grooves 18 utilized to hold the plurality of optical fibers 16. Alignment grooves 36 and 38, as shown in FIG. 3, may be formed by narrowing a pair of the illustrated v-grooves 18 from the diameter necessary to hold an optical fiber to a diameter approximately equal to the width of alignment ridges 32 and 34, for example, from a diameter of approximately 150 microns to approximately 10 microns. The depth of alignment grooves 36 and 38, denoted D in FIG. 3, is chosen to be sufficiently greater than the height of alignment ridges 34 and 36 (for example, D being greater than one micron) so that the pieces will interlock as illustrated in FIG. 4. Although illustrated as "V"-shaped, grooves, it is to be understood that alignment grooves of the present invention may comprise any compatible cross-section, for example, "U"-shaped, trapezoidal, square or rectangular. To correspond with the arrangement of FIG. 2, alignment groove 36 is disposed a distance $d_2$ from the top-most fiber v-groove $18_T$ alignment groove 38 is disposed a distance $d_2$ from the bottom-most fiber v-groove $18_B$. Alignment grooves 36, 38 comprise a depth D and width $W_G$ which allow the alignment grooves and ridges to interlock and prevent lateral motion.

In accordance with the present invention, therefore, when waveguide substrate 10 is mated with silicon chip 14, alignment ridge 32 will interlock with alignment groov 38 and, similarly, alignment ridge 34 will interlock with alignment groove 36, thus preventing any motion in the lateral direction. FIG. 4 contains an alternative view of this embodiment of the present invention, as taken along line 4—4 of FIG. 1, which clearly illustrates the interlocking alignment ridge and groove arrangement of the present invention. In particular, it is shown that alignment grooves 36 and 38 comprise both a depth D and width $W_G$ capable of accommodating alignment ridges 34 and 32, respectively, without allowing any motion in the lateral direction.

Figure 5:
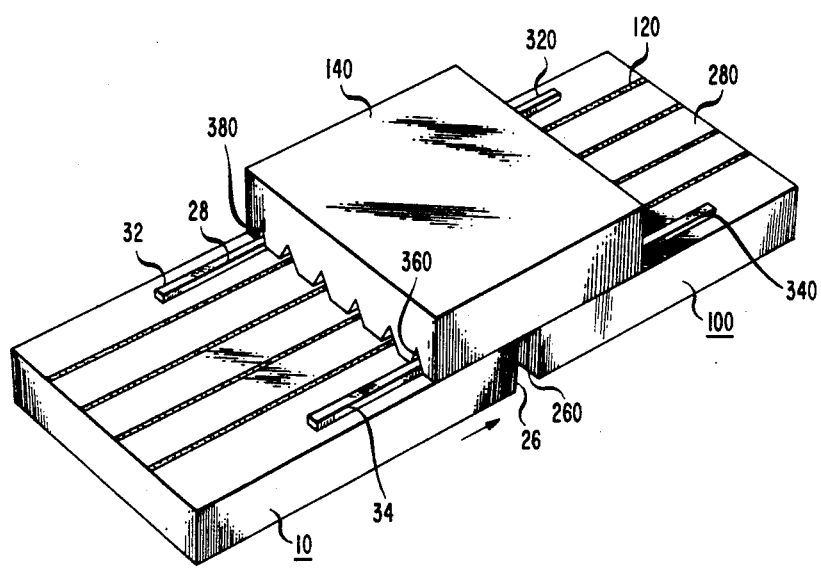
FIG. 5 illustrates an alternative embodiment of the present invention for providing waveguide-to-waveguide coupling.

There exist occasions when it is required to transmit optical signals between a pair of substrates which both contain waveguides. Presently, optical fibers are placed in contact with both substrates to provide a transmission path for the optical signal. However, this is not the optimal solution, since the addition of the fibers is reflected in the increased cost and complexity of the communication system and is also capable of degrading the performance of the system in terms of signal attenuation and lack of structure rigidity. To solve these and other problems, the interlock groove and ridge arrangement of the present invention provides a completely passive waveguide-to-waveguide coupling which eliminates the need for coupling fibers. FIG. 5 illustrates an alternative embodiment of the present invention which is used to align a pair of optical substrates which both contain at least one optical waveguide. In most instances, both substrates will contain an array of optical waveguides.

The arrangement illustrated in FIG. 5 is similar to that of FIG. 1, with the exception that a second optical substrate 100 is coupled to substrate 10 to provide waveguide-to-waveguide coupling. As shown, waveguide substrate 10 includes a plurality of waveguides 12 and alignment ridges 32 and 34, as previously discussed in association with FIG. 2. As with the above-described embodiment, it is to be understood that any number of alignment ridges and grooves may be used to form a waveguide-to-waveguide coupler in accordance with the present invention, where a pair of alignment ridges are shown for illustrative purposes only. A substrate 140 is illustrated in FIG. 5 which includes a pair of alignment grooves 360 and 380 which mate with alignment ridges 34 and 32 respectively. Substrate 140 may comprise silicon or any other suitable material. Waveguide substrate 100 is similar to substrate 10 previously discussed. That is, waveguide substrate 100 includes a plurality of waveguides 120 which are diffused into a top surface 280 of substrate 100. As with waveguides 12 of substrate 10, titanium may be used as the diffusion material to create waveguides 120. In order to provide complete optical communication between substrate 10 and substrate 100, waveguides 12 and 120 must be identical in number and placement. However, if it is desired to only communicate between selected waveguides, the actual number of waveguides may vary. Full transmission of the optical signal between waveguides 12 and 120 is achieved when an endface 26 of substrate 10 is butted against an endface 260 of substrate 100. In accordance with the present invention, lateral motion between substrate 140 and waveguide substrate 100 is prevented by including alignment ridges on substrate 100 which will interlock with alignment grooves 380 and 360 of substrate 140. More specifically, substrate 100 includes alignment ridges 320 and 340, which correspoond in both size and placement with alignment ridges 32 and 34 substrate 10. In particular, as shown in FIG. 5, alignment ridge 320 is positioned a distance $d_1$ from left-most waveguide $120_L$ and alignment ridge 340 is positioned a distance $d_2$ from right-most waveguide $120_R$, where both alignment ridges comprise the predetermined height H and width $W_R$. It is to be understood that substrate 100 is not required to have the exact same number, size or position of alignment ridges as substrate 10, so long as the alignment ridges which are present are positioned in a manner which is complementary to the alignment grooves in substrate 140. As the two substrates are moved in the direction indicated by the arrows in FIG. 5, both sets of alignment ridges will interlock with alignment grooves 360 and 380 of substrate 140. Therefore, no lateral motion with respect to any two pieces will occur and the optical signal traveling through waveguides 12 will be directly coupled to waveguides 120.

What is claimed is:

1. An optical communication system which provides optical communication between separate optical substrates, said system comprising
    a first substrate (10) containing at least one optical waveguide longitudinally disposed along a top surface thereof and at least one alignment ridge comprising a predetermined height and width disposed along said top surface parallel with said at least one optical waveguide and separated from said at least one optical waveguide by a predetermined distance; and
    a second substrate (14) containing at least one alignment groove comprising a predetermined depth and width corresponding to said predetermined height and width of said at least one alignment ridge, said at least one alignment groove longitudinally disposed on a top surface of said second substrate, wherein said at least one alignment groove and said at least one alignment ridge are capable of interlocking when said first substrate and said second substrate are mated together to automatically align said first and said second substrates.

2. An optical communication system as defined in claim 1 wherein the first substrate contains a plurality of longitudinally disposed waveguides.

3. An optical communication system as defined in claim 1 wherein the first substrate contains a plurality of longitudinally disposed alignment ridges and the second substrate contains a plurality of longitudinally disposed alignment grooves which are capable of interlocking with said plurality of alignment ridges.

4. An optical communication system as defined in claim 1 for providing single mode optical communication between the first substrate and the second substrate.

5. An optical communication system as defined in claim 1 for providing multimode optical communication between the first substrate and the second substrate.

6. An optical communication system as defined in claim 1 wherein the the second substrate further comprises at least one longitudinal fiber groove of a predetermined depth and width for containing at least one optical fiber.

7. An optical communication system as defined in claim 6 wherein the second substrate contains a plurality of longitudinal fiber grooves for holding an array of optical fibers.

8. An optical communication system as defined in claim 6 wherein the at least one alignment groove is identical in width and depth to the at least one longitudinal fiber groove.

9. An optical communication system as defined in claim 6 wherein the at least one alignment groove comprises a width which corresponds to the predetermined width of the associated at least one alignment ridge and is different from the width of the at least one longitudinal fiber groove.

10. An optical communication system as defined in claim 1 wherein said optical communication system further comprises
    a third substrate (100) containing at least one optical waveguide longitudinally disposed along a top surface thereof in a manner which provides a path for optical communication with the at least one waveguide of the first optical substrate when said first and third substrates are mated end to end, and at least one alignment ridge comprising a predetermined height and width disposed along said top surface parallel with said at least one optical waveguide and separated from said at least one optical waveguide by the predetermined distance, said at least one alignment ridge of said third substrate capable of interlocking with the at least one alignment groove of the second substrate such that direct optical communication occurs between said first and third substrates when said first and third substrates are placed in direct end-to-end contact and interlocked with said second substrate.

11. An optical communication system as defined in claim 10 wherein
    the first substrate contains a plurality of waveguides; and
    the third substrate contains a plurality of waveguides.

12. An optical communication system as defined in claims 10 wherein
    the first substrate contains a plurality of alignment ridges; and
    the third substrate contains a plurality of alignment ridges.

* * * * *